United States Patent
Tokunaga

(10) Patent No.: US 7,043,648 B2
(45) Date of Patent: May 9, 2006

(54) MULTIPROCESSOR POWER SUPPLY SYSTEM THAT OPERATES A PORTION OF AVAILABLE POWER SUPPLIES AND SELECTS VOLTAGE MONITOR POINT ACCORDING TO THE NUMBER OF DETECTED PROCESSORS

(75) Inventor: Tomoaki Tokunaga, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 464 days.

(21) Appl. No.: 10/424,101

(22) Filed: Apr. 28, 2003

(65) Prior Publication Data

US 2004/0003305 A1    Jan. 1, 2004

(30) Foreign Application Priority Data

Jun. 28, 2002  (JP) ............................. 2002-190888

(51) Int. Cl.
*G06F 1/32*   (2006.01)
(52) U.S. Cl. ........................... 713/320; 307/58; 363/89
(58) Field of Classification Search ................ 307/58; 363/89; 713/320
See application file for complete search history.

(56) References Cited

U.S. PATENT DOCUMENTS

| | | | |
|---|---|---|---|
| 5,428,523 A * | 6/1995 | McDonnal | 363/71 |
| 6,041,414 A | 3/2000 | Kikuchi | |
| 6,191,964 B1 * | 2/2001 | Boylan et al. | 363/89 |
| 6,614,133 B1 * | 9/2003 | Belson et al. | 307/58 |

FOREIGN PATENT DOCUMENTS

| | | |
|---|---|---|
| JP | 09-204240 | 8/1997 |
| JP | 2000-099166 | 4/2000 |

* cited by examiner

*Primary Examiner*—Dennis M. Butler
*Assistant Examiner*—Albert Wang
(74) *Attorney, Agent, or Firm*—Finnegan, Henderson, Farabow, Garrett & Dunner, L.L.P.

(57) ABSTRACT

An information processing apparatus capable of mounting a plurality of processors, includes a power supply device including a plurality of power supply units and configured to output power to drive the plurality of processors as loads using the power supply units. The information processing apparatus further includes a control unit which varies a total number of power supply units to be operated in the power supply units in accordance with an amount of load to be driven by the power supply device.

8 Claims, 4 Drawing Sheets

MULTIPROCESSOR POWER SUPPLY SYSTEM THAT OPERATES A PORTION OF AVAILABLE POWER SUPPLIES AND SELECTS VOLTAGE MONITOR POINT ACCORDING TO THE NUMBER OF DETECTED PROCESSORS

CROSS-REFERENCE TO RELATED APPLICATIONS

This application is based upon and claims the benefit of priority from the prior Japanese Patent Application No. 2002-190888, filed Jun. 28, 2002, the entire contents of which are incorporated herein by reference.

BACKGROUND OF THE INVENTION

1. Field of the Invention

The present invention relates to an information processing apparatus and a power supply control method used in the information processing apparatus. More specifically, the invention relates to an information processing apparatus capable of mounting a plurality of processors and a power supply control method used in the information processing apparatus.

2. Description of the Related Art

In most computer systems, recently, it has been common to use a DC/DC converter on a motherboard incorporating a processor (CPU) in order to supply power to the processor. The processor increases in power consumption year by year as its operation speed becomes high. In order to react to the increase in power consumption, a DC/DC converter capable of outputting a large current is required. The power conversion efficiency of the DC/DC converter therefore has a great influence on the power consumption of the entire system.

A DC/DC converter including a plurality of power supply units is usually employed as one capable of outputting a large current. The power supply units are synchronized with each other and their total output power is supplied to a processor.

In a conventional DC/DC converter, the number of power supply units to be incorporated in the DC/DC converter depends upon the largest amount of load to be driven by the output power of the DC/DC converter. Moreover, the DC/DC converter is so designed that all the power supply units are operated at all times. If, therefore, the actual amount of load to be driven by the output power of the DC/DC converter is smaller than the largest amount of load, the power conversion efficiency of the DC/DC converter is lowered by a useless switching operation of a switching transistor in each of the power supply units.

Particularly in a computer system that is compatible to a multiprocessor capable of mounting a plurality of processors, the amount of load to be driven by the output power of a DC/DC converter greatly varies with the number of processors actually incorporated in the computer system. If, therefore, the number of processors actually incorporated in the computer system is smaller than the largest number of processors that can be incorporated therein, a number of useless power losses occur in the DC/DC converter and accordingly the DC/DC converter decreases in power conversion efficiency.

BRIEF SUMMARY OF THE INVENTION

According to an embodiment of the present invention, there is provided an information processing apparatus capable of mounting a plurality of processors, comprising a power supply device including a plurality of power supply units and configured to output power to drive the plurality of processors as loads using the power supply units, and a control unit which varies a total number of power supply units to be operated in the power supply units in accordance with an amount of load to be driven by the power supply device.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 is a timing chart showing an operation of the power supply device shown in FIG. 2; and.

DETAILED DESCRIPTION OF THE INVENTION

An embodiment of the present invention will now be described with reference to the accompanying drawings.

Figure 1:
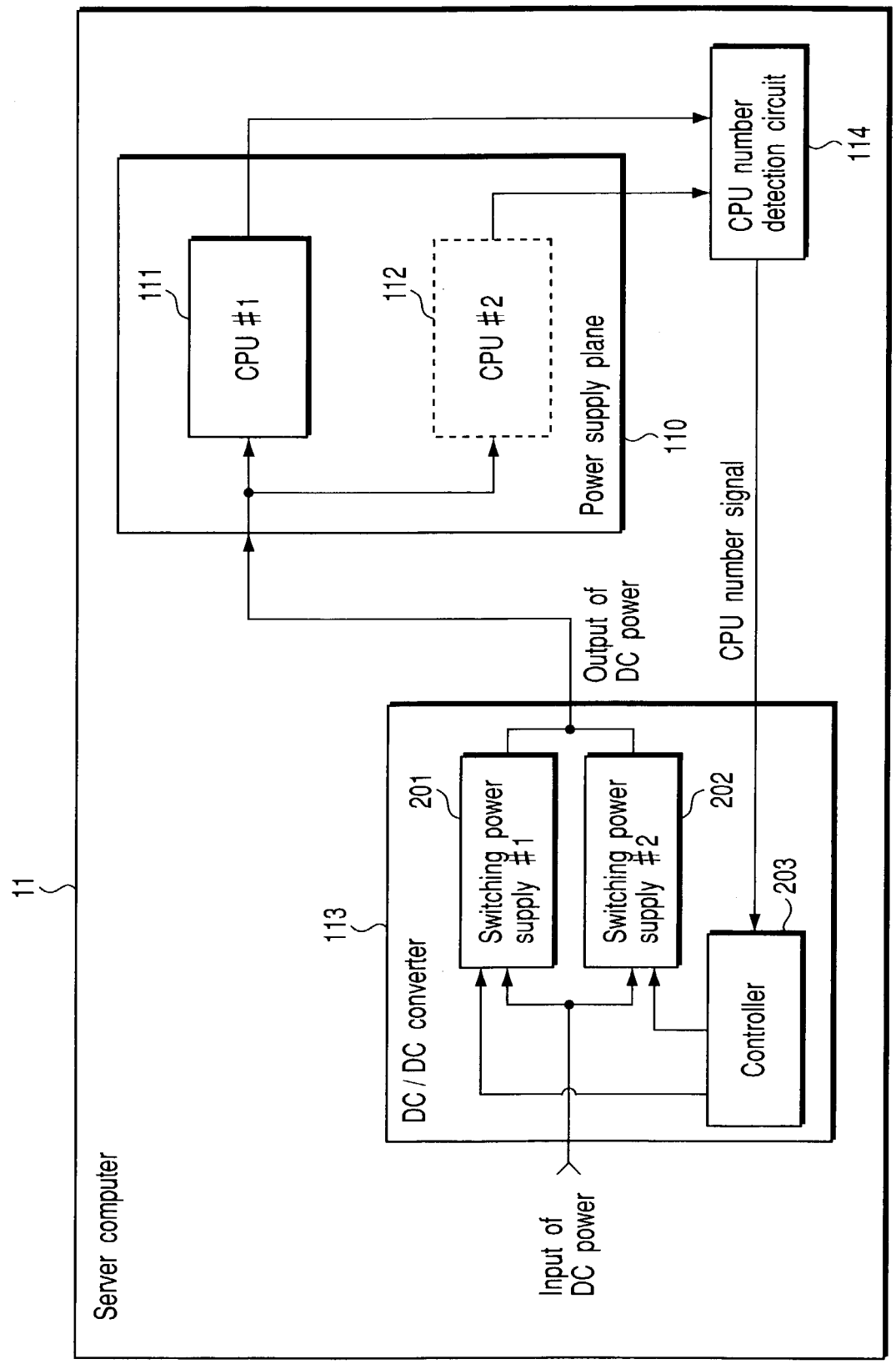
FIG. 1 is a block diagram showing a configuration of an information processing apparatus according to an embodiment of the present invention.

FIG. 1 illustrates a configuration of a server computer according to an embodiment of the present invention. The server computer 11 is an information processing apparatus capable of mounting a plurality of processors (CPU). In this embodiment, assume that the server computer 11 is capable of mounting two CPUs 111 and 112.

The first CPU 111 is a processor that is standard-mounted on a motherboard of the server computer 11. The motherboard is formed of a multilayer printed circuit board. The multilayer printed circuit board includes at least a power supply layer and a signal wiring layer. The power supply layer includes a power supply plane 110 of a copper foil layer. The first CPU 111 is mounted on the surface of the signal wiring layer and its power input pins are connected to the power supply plane 110 via through holes or the like.

An area for mounting the second CPU 112 is secured on the surface of the signal wiring layer of the printed circuit board. The second CPU 112 is an optional processor that is mounted when the need arises. For example, the CPU 112 is mounted on the surface of the signal wiring layer with a CPU socket formed therebetween. When the second CPU 112 is mounted on the surface of the signal wiring layer, its power input pins are connected to the power supply plane 110 via through holes or the like. In other words, the power supply plane 110 serves as a feeder lane for feeding power to both of the first and second CPUs 111 and 112 mounted on the server computer 11.

A DC/DC converter 113 is mounted on the surface of the signal wiring layer of the printed circuit board. The DC/DC converter 113 is an onboard power supply device used exclusively for processors, which supplies power to all of the CPUs that can be provided in the server computer 11. In other words, the DC/DC converter 113 generates power, which is to be supplied to the first and second CPUs 111 and 112 at once, from input DC power. The DC/DC converter 113 receives DC power from an external power supply such as an AC adapter. The DC/DC converter 113 converts a voltage value of the received DC power into that of DC power to be supplied to the CPUs 111 and 112.

The DC power output terminal of the DC/DC converter 113 is connected to the power supply plane 110 via a through hole or the like. Thus, the DC power generated from the DC/DC converter 113 is supplied to the CPUs 111 and 112 through the power supply plane 110.

The DC/DC converter 113 includes a plurality of power supply units for outputting DC power having a large current and a low voltage. The outputs of the power supply units are connected to each other and the total output power of the power supply units becomes equal to the output DC power of the DC/DC converter 113. The DC/DC converter 113 is so designed that it can generate an adequate power supply current even when the number of CPUs mounted on the server computer 11 is the maximum (two in this embodiment).

In the following descriptions, assume that the DC/DC converter 113 includes first and second switching power supply units 201 and 202 in order to supply adequate power to the two CPUs 111 and 112.

Each of the first and second switching power supply units 201 and 202 is formed of a DC/DC converter circuit having a switching transistor. The switching power supply units 201 and 202 are synchronized with each other.

The DC/DC converter 113 also includes a controller 203. The controller 203 is configured so as to variably control the total number of switching power supply units to be operated in accordance with the amount of load that is driven by the DC/DC converter 113.

The amount of load of the DC/DC converter 113 varies with the number of CPUs actually mounted on the printed circuit board. When only the first CPU 111 is mounted, the amount of load of the DC/DC converter 113 is reduced to half as compared with the case where both the first and second CPUs 111, 112 are mounted.

If the two CPUs 111 and 112 are mounted, the controller 203 operates the first and second switching power supply units 201 and 202. If only the first CPU 111 is mounted, the controller 203 operates only one of the switching power supply units 201 and 202.

A CPU number detection circuit 114 is mounted on the surface of the signal wiring layer of the printed circuit board. The circuit 114 detects the number of CPUs mounted on the printed circuit board in order to detect the amount of load to be driven by the DC/DC converter 113. This detection is performed for each of the CPUs 111 and 112 by monitoring a voltage of a specific terminal on the printed circuit board to which the CPU is connected.

If only the first CPU 111 is mounted, the CPU number detection circuit 114 outputs a CPU number signal of logic "1" that indicates a single processor configuration (the number of CPUs is 1). If the two CPUs 111 and 112 are mounted, the circuit 114 outputs a CPU number detection signal of logic "0" that indicates a dual processor configuration (the number of CPUs is 2). The CPU number signal is supplied to the controller 203 of the DC/DC converter 113 and thus the controller 203 is notified of the amount of load to be driven by the DC/DC converter 113.

Figure 2:
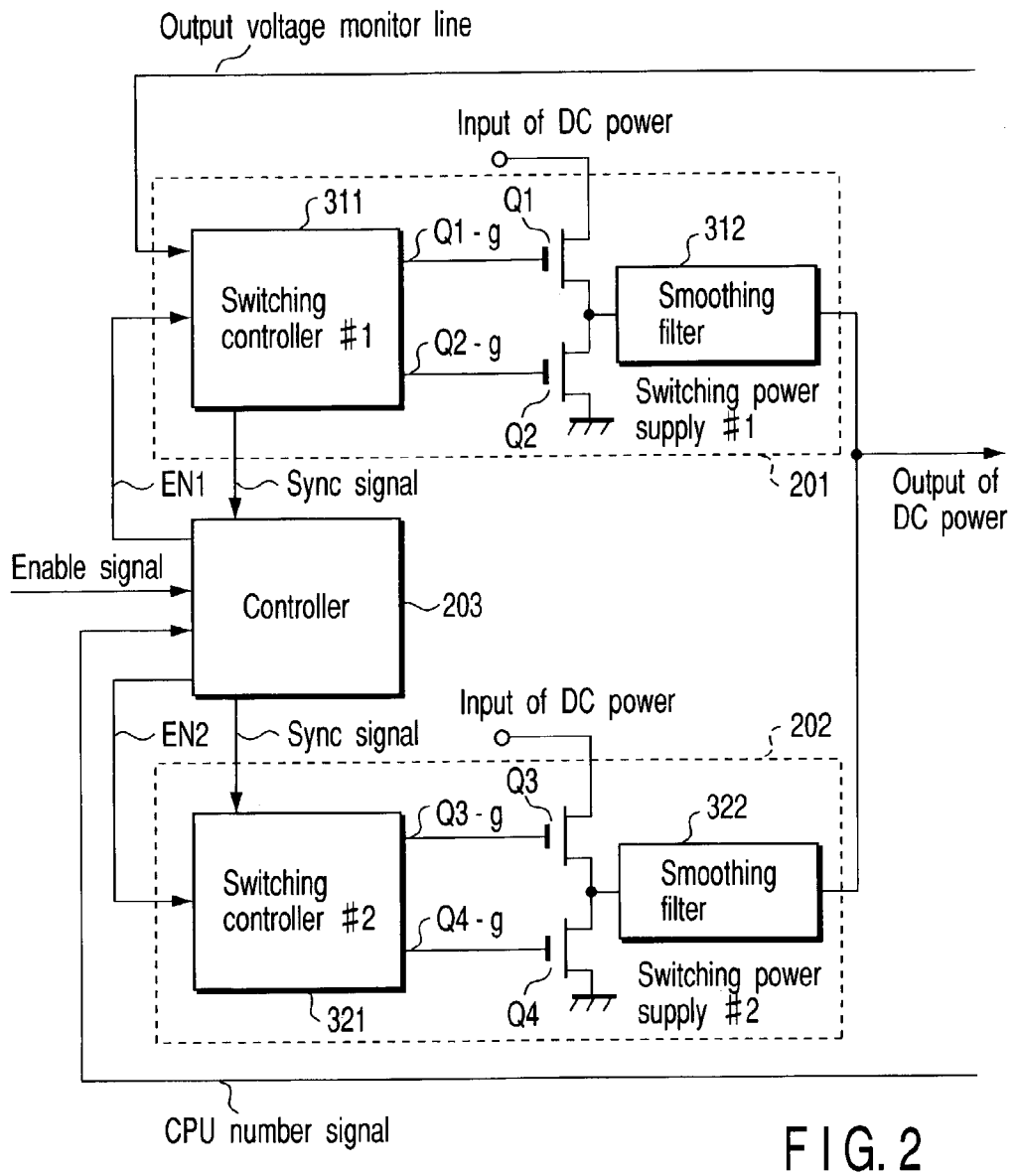
FIG. 2 is a circuit diagram showing a configuration of a power supply device provided in the information processing apparatus shown in FIG. 1.

FIG. 2 shows a specific example of the circuit arrangement of the DC/DC converter 113.

In this example, assume that the first and second switching power supply units 201 and 202 are each a well-known synchronized-rectification type DC/DC converter circuit.

The first and second switching power supply units 201 and 202 operate in the two-phase controlled synchronized-rectification mode. In this mode, the switching power supply units 201 and 202 operate at the same switching frequency, and the switching timing of the unit 202 is half cycle behind that of the unit 202.

The first switching power supply unit 201 includes a switching controller 311, two switching transistors Q1 and Q2 serving as high-side and low-side transistors, respectively, and a smoothing filter 312. The switching controller 311 controls the switching of the switching transistors Q1 and Q2.

The high-side transistor Q1 is controlled by a first switching control signal Q1-$g$ and the low-side transistor Q2 is controlled by a second switching control signal Q2-$g$. The switching control signals Q1-$g$ and Q2-$g$ are PWM signals whose phases are opposed to each other.

When the high-side transistor Q1 turns on, the low-side transistor Q2 turns off. When the high-side transistor Q1 turns off, the low-side transistor Q2 turns on.

The duty ratio between on-period and off-period of the high-side transistor Q1 is controlled by the voltage value on the power supply plane 110. The voltage value is input to the switching controller 311 via an output voltage monitor line. The switching controller 311 receives and monitors the voltage value to adjust a power supply voltage of output power (output DC power) such that the voltage value becomes a proper value. If the voltage value on the power supply plane 110 is smaller than the proper value, the proportion of on-period to the switching period of the high-side transistor Q1 increases. If the voltage value on the power supply plane 110 is larger than the proper value, the proportion of on-period to the switching period of the high-side transistor Q1 decreases.

The second switching power supply unit 202 includes a switching controller 321, two switching transistors Q3 and Q4 serving as high-side and low-side transistors, respectively, and a smoothing filter 322. The switching controller 321 controls the switching of the switching transistors Q3 and Q4.

The timing at which the switching controller 321 controls the switching of the switching transistors Q3 and Q4 is controlled in response to a sync signal transmitted from the switching controller 311 of the first switching power supply unit 201 through the controller 203. Thus, the first and second switching power supply units 201 and 202 are synchronized with each other in the two-phase controlled synchronized-rectification mode described above.

The controller 203 operates in response to an external enable signal. The controller 203 can enable/disenable each of the switching power supply units 201 and 202.

When the CPU number signal is "0" (dual processor configuration), the controller 203 supplies active-state enable signals EN1 and EN2 to the switching controllers 311 and 321 to operate the switching power supply units 201 and 202, respectively. On the other hand, when the CPU number signal is "1" (single processor configuration), the controller 203 supplies an active-state enable signal EN1 and an inactive-state enable signal EN2 to the switching controllers 311 and 321 to operate the switching power supply unit 201 only.

As described above, when the number of CPUs is one, only the switching power supply unit 201 is operated to reduce a power loss due to a needless switching operation of the switching power supply unit 202. This power loss is a gate drive loss Pg(w) of each of the switching transistors Q3 and Q4 of the switching power supply unit 202. The gate drive loss Pg(w) is given by the following equation:

$$Pg = Qgd \times Vg \times f$$

where Qgd is the amount of gate charge (C), Vg is the gate drive voltage (V), and f is the switching frequency (Hz).

Figure 3:
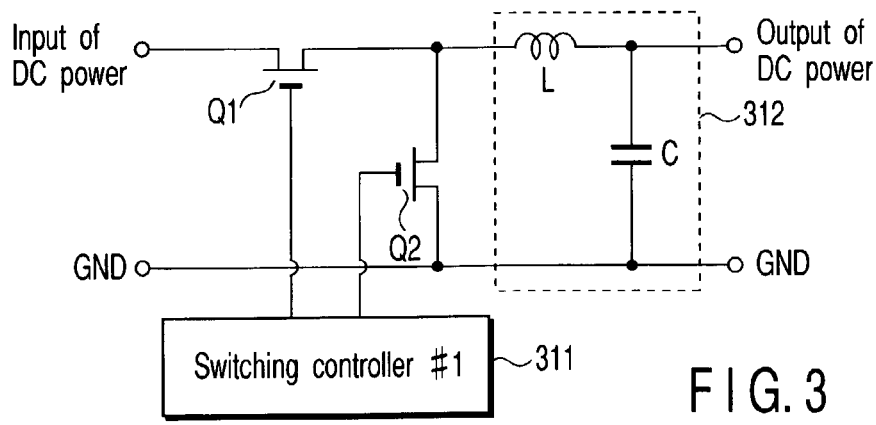
FIG. 3 is a circuit diagram showing a configuration of switching power supply unit provided in the power supply device shown in FIG. 2.

FIG. 3 shows a specific example of the circuit arrangement of the switching power supply unit 201.

The smoothing filter 312 includes a coil L and a capacitor C. The source-to-drain current path of the high-side transistor Q1 is inserted between a DC power input terminal and coil L, and the source-to-drain current path of the low-side transistor Q2 is inserted between a ground terminal and a connection node between the high-side transistor Q1 and coil L. The switching power supply unit 202 has the same configuration as that of the switching power supply unit 201 shown in FIG. 3.

Figure 4:
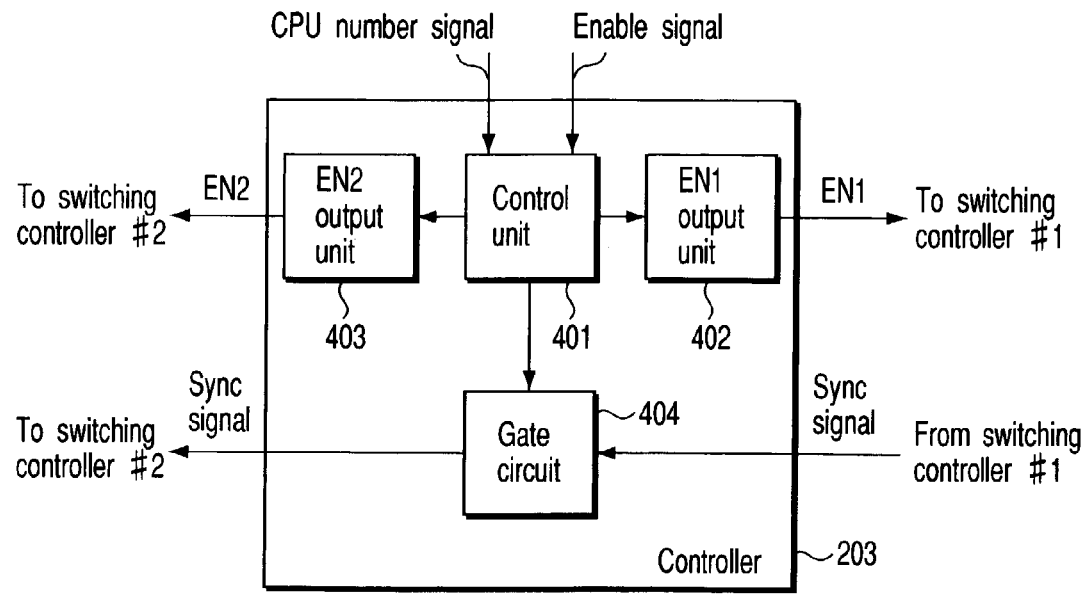
FIG. 4 is a block diagram showing a configuration of a controller provided in the power supply device shown in FIG. 2.

FIG. 4 shows an example of the configuration of the controller 203.

Referring to FIG. 4, the controller 203 includes a control unit 401, an enable signal EN1 output unit 402, an enable signal EN2 output unit 403, and a gate circuit 404. The control unit 401 is enabled by an external enable signal. The control unit 401 determines the total number of switching power supply units to be operated in response to the CPU number signal and, based on the determination, controls the enable signal EN1 output unit 402, enable signal EN2 output unit 403 and gate circuit 404.

The enable signal EN1 output unit 402 generates an enable signal EN1, which is to be supplied to the switching controller 311, under the control of the control unit 401. The enable signal EN2 output unit 403 generates an enable signal EN2, which is to be supplied to the switching controller 321, under the control of the control unit 401.

When the CPU number signal is "0" (dual processor configuration), the control unit 401 allows the enable signal EN1 output unit 402 and enable signal EN2 output unit 403 to generate enable signals EN1 and EN2, respectively. When the CPU number signal is "1" (single processor configuration), the control unit 401 allows the enable signal EN1 output unit 402 to generate an enable signal EN1 but inhibits the enable signal EN2 output unit 403 from generating an enable signal EN2.

Under the control of the control unit 401, the gate circuit 404 allows or inhibits the sync signal output from the switching controller 311 to be transferred or from being transferred to the switching controller 321. When the CPU number signal is "0" (dual processor configuration), the sync signal output from the switching controller 311 is transferred to the switching controller 321 through the gate circuit 404. However, when the CPU number signal is "1" (single processor configuration), the sync signal output from the switching controller 311 is cut off by the gate circuit 404.

Figure 5:
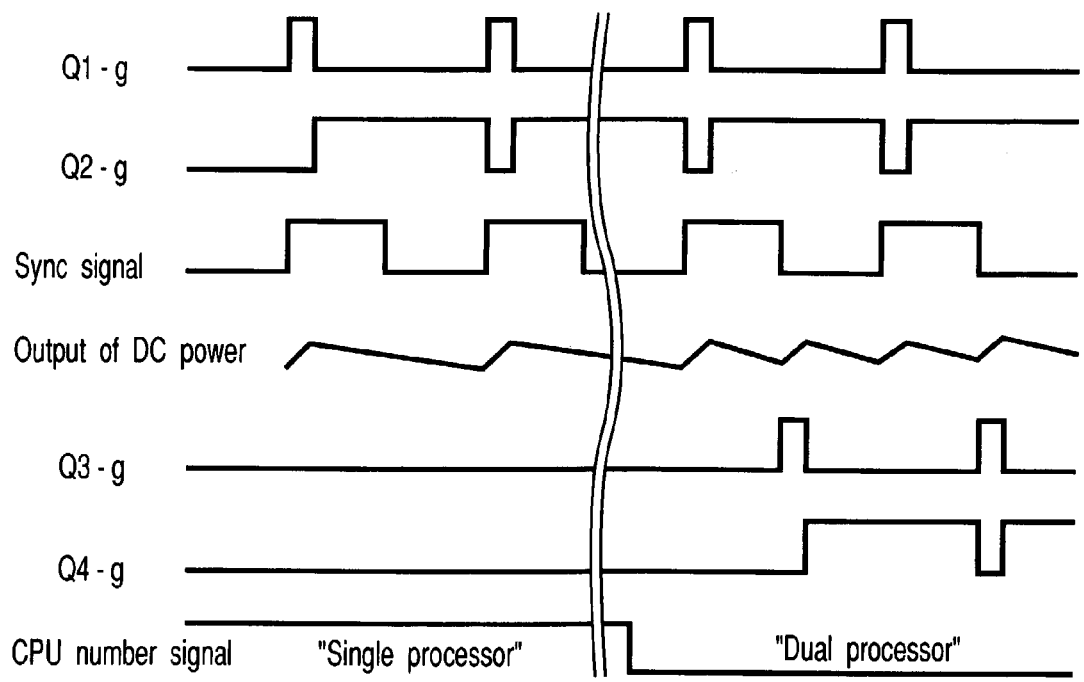

FIG. 5 shows a timing chart of an operation of the DC/DC converter 113.

When the CPU number signal is "1" (single processor configuration), only the switching controller 311 of the switching power supply unit 201 operates and the switching controller 321 of the switching power supply unit 202 does not operate. The DC power is output by controlling the switching of the switching transistors Q1 and Q2 in the switching power supply unit 201 in response to the switching control signals Q1-g and Q2-g. The switching control signals Q3-g and Q4-g are maintained in the inactive state and thus the switching transistors Q3 and Q4 in the switching power supply unit 202 are maintained in the OFF state.

When the CPU number signal is "0" (dual processor configuration), the switching controller 311 of the switching power supply unit 201 and the switching controller 321 of the switching power supply unit 202 operate. The switching of the switching transistors Q1 and Q2 in the switching power supply unit 201 is controlled in response to the switching control signals Q1-g and Q2-g, respectively. The switching of the switching transistors Q3 and Q4 in the switching power supply unit 202 is controlled in response to the switching control signals Q3-g and Q4-g, respectively.

Since the two switching power supply units 201 and 202 are operated in synchronization with each other as described above, they can output an adequate power supply current. In particular, the switching power supply units 201 and 202 are operated out of phase with each other; therefore, the switching transistors Q1 and Q3 in the switching power supply units 201 and 202 do not turn on simultaneously. Consequently, a so-called ripple noise does not occur.

As described above, in the server computer 11 according to the embodiment of the present invention, the total number of switching power supply units to be operated is variably controlled in accordance with the amount of load to be driven by the power output from the DC/DC converter 113. Therefore, when the amount of load is smaller than the largest amount of load that is predetermined, the total number of switching power supply units can be reduced and accordingly the power conversion efficiency of the DC/DC converter 113 can be prevented from decreasing.

The amount of load to be driven by the DC/DC converter 113 greatly varies with the number of mounted CPUs. The detection of the amount of load can thus be performed with efficiency by detecting the number of mounted CPUs, as described above.

If the mounted CPU can be operated in either a normal operation mode or a power save mode whose power consumption is lower than that of the normal operation mode, the total number of switching power supply units to be operated can be varied according to whether the current CPU operation mode is the normal operation mode or the power save mode.

Figure 6:
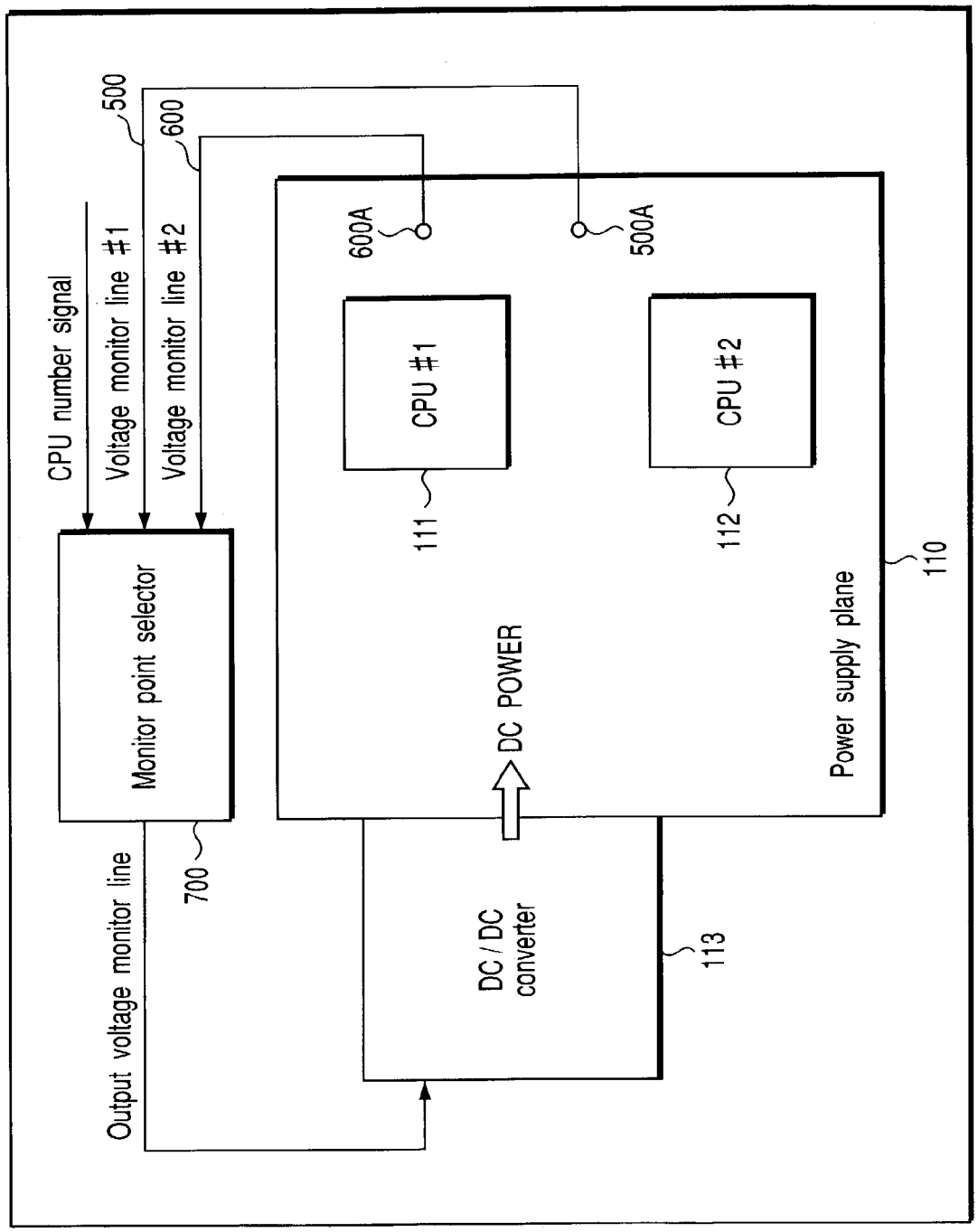
FIG. 6 is a diagram of switching of a voltage monitoring point of the power supply device shown in FIG. 2.

A method of holding an output power supply voltage appropriately will now be described with reference to FIG. 6.

As described above, the DC power output from the DC/DC converter 113 is supplied to the CPUs 111 and 112 through the power supply plane 110. In order to determine whether the power supply voltage of the output DC power has a proper value, the DC/DC converter 113 monitors the voltage on the power supply plane 110 that is applied through the output voltage monitor line. In the present embodiment, a specific point on the power supply plane 110 is not used as a fixed voltage monitor point but any one of voltage monitor points prepared on the power supply plane 110 is selectively used.

More specifically, two voltage monitor points 500A and 600A are arranged on the power supply plane 110. The voltage monitor point 500A is located halfway between a mounting position of the CPU 111 and that of the CPU 112. On the other hand, the voltage monitor point 600A is located close to the mounting position of the CPU 111. Voltage monitor lines 500 and 600 are connected to the voltage monitor points 500A and 600A, respectively.

A monitor point selector 700 selects one of the voltage monitor lines 500 and 600 in response to the CPU number signal. In other words, the selector 700 selects the voltage monitor line 500 when the CPU number signal is "0" (dual processor configuration) and selects the voltage monitor line 600 when it is "1" (single processor configuration).

In the dual processor configuration, the voltage value at the voltage monitor point 500A located halfway between the mounting positions of the CPUs 111 and 112 is fed back to the DC/DC converter 113 through the voltage monitor line 500. The DC/DC converter 113 adjusts the power supply voltage of the output power such that the fed-back voltage value becomes a proper value. In the single processor configuration that only the CPU 111 is mounted, the voltage value at the voltage monitor point 600A located close to the mounting position of the CPU 111 is fed back to the DC/DC converter 113 through the voltage monitor line 600. The DC/DC converter 113 adjusts the power supply voltage of the output power such that the fed-back voltage value becomes a proper value.

Consequently, the power supply voltage of the output power can properly be controlled by selecting a voltage monitor point according to the number of mounted CPUs.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing apparatus capable of mounting a plurality of processors, comprising:
    a power supply device including a plurality of power supply units and configured to output power to drive the processors, the power output from the power supply device being supplied to each of the processors through a power supply plane to which the processors are connected;
    a unit which detects the number of processors;
    a control unit which varies a total number of power supply units to be operated in the power supply device in accordance with the detected number of processors; and
    a unit which selects one of a plurality of voltage monitor points arranged on the power supply plane in accordance with the detected number of processors,
    wherein the power supply device includes a unit which adjusts a voltage value of power output in accordance with a voltage value of the selected voltage monitor point.

2. The information processing apparatus according to claim 1, wherein each of the power supply units includes a DC/DC converter having a switching transistor.

3. The information processing apparatus according to claim 1, wherein each of the power supply units includes a synchronized-rectification type DC/DC converter.

4. The information processing apparatus according to claim 1, wherein the control unit includes a unit which sets at least one of the power supply units in one of an enabled state and a disabled state in accordance with the detected number of processors.

5. A method of generating power to drive a plurality of processors, which are to be provided in an information processing apparatus, using a power supply device including a plurality of power supply units, the power output from the power supply device being supplied to each of the processors through a power supply plane to which the processors are connected, the method comprising:
    detecting the number of processors;
    varying a total number of power supply units to be operated in the power supply device in accordance with the detected number of processors; and
    selecting one of a plurality of voltage monitor points arranged on the power supply plane in accordance with the detected number of processors,
    wherein the power supply device includes a unit which adjusts a voltage value of power output in accordance with a voltage value of the selected voltage monitor point.

6. The method according to claim 5, wherein each of the power supply units includes a DC/DC converter having a switching transistor.

7. The method according to claim 5, wherein each of the power supply units includes a synchronized-rectification type DC/DC converter.

8. The method according to claim 5, wherein the varying includes setting at least one of the power supply units in one of an enabled state and a disabled state in accordance with the detected number of processors.

* * * * *